Dec. 26, 1967 S. GEORGE 3,360,271

MEANS FOR PREVENTING RELATIVE SLIPPAGE
BETWEEN PHONOGRAPH RECORDS

Original Filed June 11, 1962

INVENTOR
STEPHEN GEORGE
BY
ATTORNEY.

United States Patent Office 3,360,271
Patented Dec. 26, 1967

3,360,271
MEANS FOR PREVENTING RELATIVE SLIPPAGE BETWEEN PHONOGRAPH RECORDS

Stephen George, 247 Swinton Ave., Bronx, N.Y. 10465

Substituted for abandoned application Ser. No. 201,702, June 11, 1962. This application Dec. 16, 1966, Ser. No. 602,404
6 Claims. (Cl. 274—42)

ABSTRACT OF THE DISCLOSURE

Method and apparatus for preventing relative slippage between disc type records when played on an automatic record changer phonograph. By the use of a press polished vinyl film arranged preferably in the vicinity of the label of the record, on both upper and lower surfaces of the record, interengagement between superimposed records occurs preventing relative slippage between the records.

*Background of the invention*

This invention relates to disc type phonograph records, and more particularly to means for preventing relative slippage of the records with respect to each other, so as to eliminate distortion of the reproduced sound when the record does not rotate at he speed of the turntable convenionally employed in record players.

Record players are offered equipped with automatic record changers which drop records one at a time onto a turntable. In order to get accurate reproduction of the desired sound, it is necessary that the record be rotated at the speed of the turnable. Any slippage between the record and turntable produces a distortion of the desired sound. The first record deposited on the turntable usually does not slip with respect to the turnable due to the felted surfaces conventionally provided on record playing turntables. However, subsequent records deposited on the first record tend to slip with respect to each other because of the relatively friction free properties of the contacting surfaces of the superposed records.

Attempts have been made in the prior art to increase the relative frictional engagement between superposed records by the use of roughened surfaces on each side of the records to provide friction between the contacting surfaces of such records, as shown, for example, by the French Patent #1,121,069 to Mailland. The use of friction producing materials such as disclosed by Mailland serves to increase the thickness of the record, thus increasing required storage facilities, and limiting the number of records which can be played at any given time. Additionally, these friction producing surfaces provided on the record effect its appearance, and often act as dust producers. A further problem arising in the use of rough friction producing materials on the record surface to prevent slippage is that these roughened surfaces tend to abrade and damage the record grooves of adjacent records when they are slid with respect to each other.

*Summary of the invention*

It is with the above problems and considerations in mind that the present improved means have been evolved serving to prevent relative slippage between record surfaces, without increasing the thickness of the record, and without affecting the appearance of the record, or offering an abrasive surface which may damage the record grooves of adjacent records when these records are slipped with respect to each other.

It is, accordingly, among the primary objects of this invention to provide means on disc type phonograph records which will prevent relative slippage between superposed records, with the means subject to application to the record without increasing its thickness, or affecting its appearance, or offering an abraised surface which may damage adjacent records when they are slid with respect to the record.

According to the invention, it has been discovered that a polyvinyl acetal resin, when plasticized to form sheets, display a "tacky" property with respect to themselves. The above noted problems are eliminated, and the objects are achieved by providing a ring of vinyl film exhibiting these "tacky" properties on a record. The ring is preferably employed either independently of the record label, or as the label itself. This vinyl film is preferably press polished and of a thickness equal to that of the label and colored to provide desired esthetic appearance to the record. It may either be made black, as is the color of conventional records, or made to match or complement the color of the desired label. This press polished vinyl film ring is secured on opposite faces of the record, and when two or more such records are superposed, the contact between the press polished rings produces a surface interengagement which prevents relative slippage.

*Brief description of the drawing*

The specific details of a preferred embodiment of the invention, and their mode of functioning, will be particularly pointed out in conjunction with the accomanying drawings wherein.

*Description of the preferred embodiment*

Figure 1:
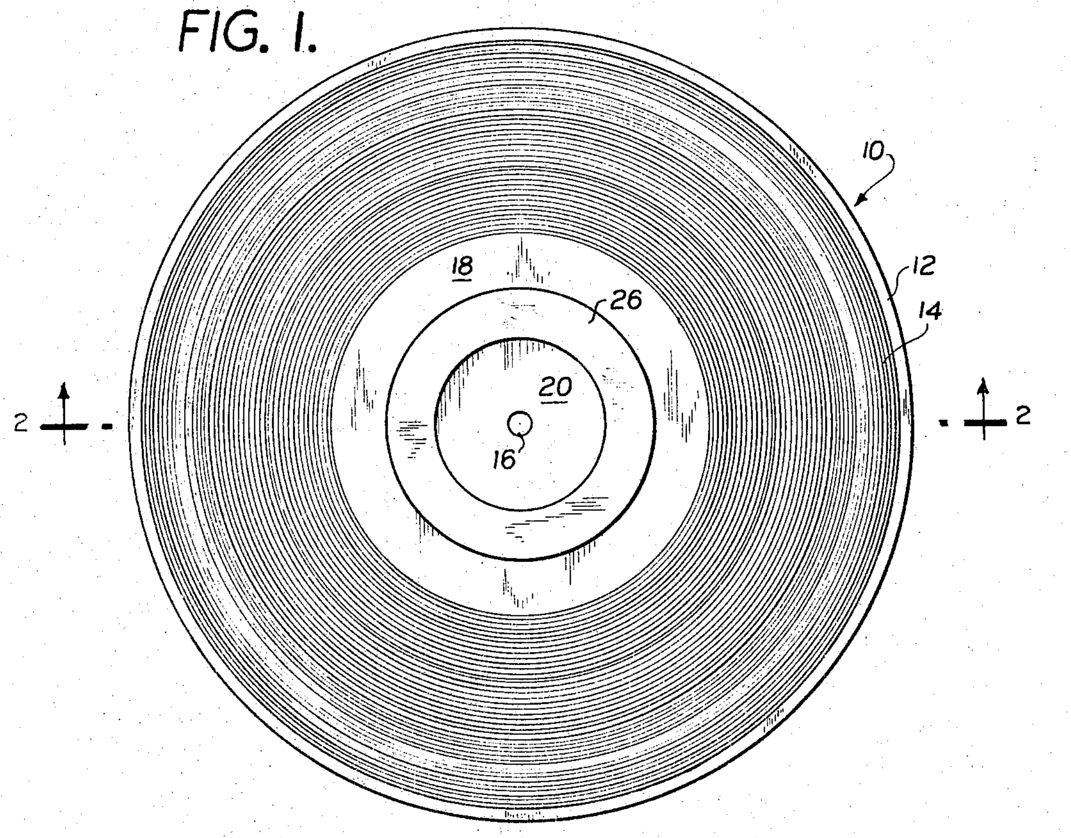
FIG. 1 is a top plan view of a disc type phonograph record embodying the invention.
Figure 2:
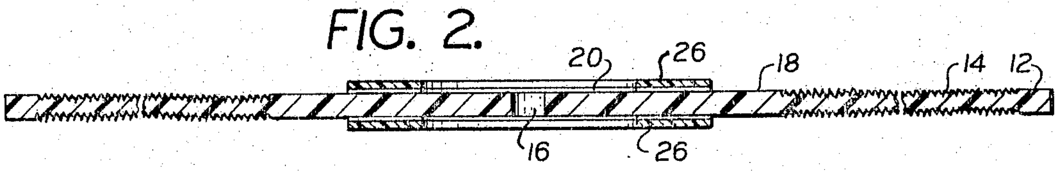
FIG. 2 is an enlarged horizontal sectional view taken on line 2—2 of FIG. 1 with parts broken away.

Referring now more particularly to the drawings, like numerals in the various figures will be employed to designate like parts. As seen in FIG. 1, a disc type phonograph record 10 is shown. The record 10 is of conventional construction formed of a flat disc shaped body 12. The conventional spiral sound track employed on such record is formed in groove 14 formed on each surface of the body 12, and in conventional fashion, it will be understood that the needle of the record player is guided in the groove from the outer edge of the record to the center.

The conventional spindle hole 16 is provided in the center of the record body 12 through which the post or spindle of the turntable extends. A smooth, flat, circular area 18 surrounds the spindle hole 16 and the conventional label 20 is illustrated in position in the area 18 on each side of the body 12.

Figure 3:
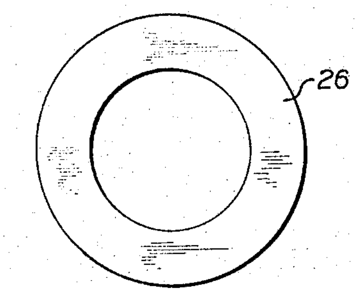
FIG. 3 is a top plan view of the ring which may be used in practicing the invention.
Figure 4:
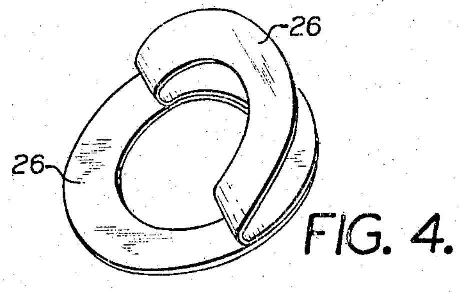
FIG. 4 is a perspective view of a pair of superimposed rings with one ring being separated from the others to illustrate their relative interengagement.

In accordance with the illustrated preferred embodiment of the invention, ring 26, as best seen in FIG. 3 is secured to the record adjacent the label area. It will be understood by those skilled in the art that this ring 26 may be formed of a dimension such as to serve as the label itself, or may be secured over the label.

It has been found that most conventionally available vinyl sheeting exhibits desired "tacky" properties, making it suitable for forming ring 26. It is preferred, however, to press polish the vinyl by passing between calendering rolls. A preferred from of the film employed in forming ring 26 is one having a hardness equal to a 65 Shore durometer "A."

A desired film may be made in the following fashion by employing the following constituents:

| | Parts |
|---|---|
| (1) High molecular weight vinyl resin (any of the following commercial products) | |
| (a) B. F. Goodrich—Geon–101 EP | |
| (b) Diamond Alkali Co.—PVC–500 | |
| (c) Cumberland Chemical Co.—Cumberland–210 | 100 |
| (2) Dioctal phthalate (general purpose plasticizer) | 30 |
| (3) Polymeric Type plasticizer | |
| (a) Rohm & Haas—G–54 | 20 |
| (4) Dioctyl Adipate (plasticizer with low temperature properties) | 15 |
| (5) Epoxy Type aid in Heat Stabilization | |
| (a) Rohm & Haas—G–62 | 5 |
| (6) Heat Stabilizer | |
| (a) M. & T. Chemicals—Thermolite 119 | 2 |
| (7) Lubricant—Stearic Acid | ½ |
| Total | 172½ |

The following production procedure is preferably followed:

(1) Prepare a premix of item #1 thru #7 in a ribbon blender.

(2) Feed in a Banbury Mixer—mix at slow speed at 275° F. until mix is masticated.

(3) Feed the masticated plastic into a roll mill with mill rolls heated to 315° F.

(4) The output from the mill is fed into heated calender rolls operating at a temperature of 325° F. This process shapes the vinyl into the desired gauge film.

(5) The vinyl film is then passed between polishing rolls which have chrome plated mirror finish sufaces. These rolls polish the surface of the vinyl film to a high gloss equal to 150 Gardner units on the Gardner scale (Gardner Instrument Corp., Maryland).

(6) The vinyl film is cut into sheets and each sheet is individually placed between the polishing platens of a press-polishing press. The purpose of this press is to transfer the chromed, mirror finish of the platens to the surface of the vinyl. During the polishing cycle, the platens are heated to a temperature of 275° F. and the vinyl film placed under a pressure of 250 p.s.i. for a period of 2 minutes, after which the platens are cooled, the pressure released, and the vinyl sheets removed. The vinyl surface will have acquired from the mirror polish of the platens a high degree of gloss, known in the trade as a press-polished finish.

The ring 26 formed in accordance with the above described procedure may be made either transparent, colored to match the color of the record, or match or complement the color of the label, and is preferably of a thickness equal to the thickness of the label.

By forming a ring in accordance with the above described procedure, and affixing the ring to opposite faces of the record, preferably in the label area, when this record is played on a record changer, there will be relatively little slippage between superposed records due to the tendency of the press polished vinyl surfaces to stick together.

It has thus been discovered that the tacky properties of a variety of conventional polyvinyl acetal resin plastics serve to make these plastics a desirable adjunct to any disc type phonograph record. According to the literature and the experience of the inventor, polyvinyl acetal resins such as described in U.S. Patent 2,303,826, and Reissue Patent 20,430 may be employed to form the ring.

The above disclosure has been given by way of illustration and elucidation, and not by way of limitation, and it is desired to protect all embodiments of the herein disclosed inventive concept within the scope of the appended claims.

What is claimed is:

1. A phonograph record of the disc type comprising a thin circular plastic body with a central hole therein and a spiral grooved track on each side surface thereof, said body having a smooth surface around the hole on each side surface thereof, a preforated label superposed on each smooth surface and a ring on the label at the periphery of the label, said ring being composed of flexible vinyl plastic film having inherently sticky, highly polished outer surfaces adhered onto the label.

2. As an article of manufacture, a ring for superimposing on a disc type record to provide a nonslippery sticky surface without interference with separation of superimposed records, said ring having a surface affording molecular attraction, with adhesive backing to adhere to said record.

3. An article of manufacture, as in claim 2, in which said ring has one surface of press polished plastic vinyl film.

4. The method of making a disc type record slipproof comprising the step of securing a ring having a highly polished sticky surface, to the record.

5. A method of making a disc type record slip-proof, as in claim 4, in which said ring is formed with one surface of press polished plastic vinyl film.

6. A method, as in claim 5, in which said ring is secured to both faces of the record.

No references cited.

LEONARD FORMAN, *Primary Examiner.*

FELIX J. D'AMBROSIO, *Assistant Examiner.*